United States Patent
Goodman et al.

(10) Patent No.: US 8,047,706 B2
(45) Date of Patent: Nov. 1, 2011

(54) CALIBRATION OF TEMPERATURE CONTROL SYSTEM FOR SEMICONDUCTOR PROCESSING CHAMBER

(75) Inventors: Matthew G. Goodman, Chandler, AZ (US); Mark Hawkins, Gilbert, AZ (US); Ravinder Aggarwal, Gilbert, AZ (US); Michael Givens, Phoenix, AZ (US); Eric Hill, Goodyear, AZ (US); Gregory Bartlett, Chandler, AZ (US)

(73) Assignee: ASM America, Inc., Phoenix, AZ (US)

( * ) Notice: Subject to any disclaimer, the term of this patent is extended or adjusted under 35 U.S.C. 154(b) by 585 days.

(21) Appl. No.: 12/273,440

(22) Filed: Nov. 18, 2008

(65) Prior Publication Data
US 2009/0147819 A1 Jun. 11, 2009

Related U.S. Application Data

(60) Provisional application No. 61/012,397, filed on Dec. 7, 2007.

(51) Int. Cl.
*G01K 15/00* (2006.01)
(52) U.S. Cl. ............. 374/1; 374/102; 374/178; 702/99; 438/14; 324/750.02
(58) Field of Classification Search .............. 374/1, 102, 374/178; 702/99; 438/14; 324/750.02
See application file for complete search history.

(56) References Cited

U.S. PATENT DOCUMENTS

| | | | |
|---|---|---|---|
| 4,302,731 A * | 11/1981 | Ashida | 331/116 R |
| 4,316,080 A * | 2/1982 | Wroblewski | 219/505 |
| 4,454,483 A * | 6/1984 | Baylor | 331/11 |
| 5,326,170 A * | 7/1994 | Moslehi et al. | 374/2 |
| 6,126,744 A | 10/2000 | Hawkins et al. | |
| 6,179,466 B1 * | 1/2001 | Peuse et al. | 374/128 |
| 6,207,936 B1 | 3/2001 | de Waard et al. | |
| 6,596,973 B1 | 7/2003 | Donald et al. | |
| 6,950,774 B2 | 9/2005 | Donald | |
| 7,289,865 B2 | 10/2007 | Bauer | |
| 7,368,014 B2 * | 5/2008 | Doan | 117/89 |
| 7,572,052 B2 * | 8/2009 | Ravi et al. | 374/1 |
| 2004/0005147 A1 | 1/2004 | Wang et al. | 392/418 |
| 2009/0245320 A1 * | 10/2009 | Timans | 374/2 |
| 2011/0076786 A1 * | 3/2011 | Ahmad et al. | 438/5 |

* cited by examiner

*Primary Examiner* — Christopher Fulton
(74) *Attorney, Agent, or Firm* — Knobbe Martens Olson & Bear LLP (57) ABSTRACT

Methods and systems for calibrating a temperature control system in a vapor deposition chamber. A temperature sensor senses temperature within a semiconductor processing chamber and generates an output signal. A temperature control system controls a chamber temperature by controlling a heating apparatus based on the output signal. A method includes instructing the control system to target a setpoint temperature, and depositing a layer of material onto a surface in the chamber by a vapor deposition process. A variation of a property of the layer is measured while depositing the layer, the property known to vary cyclically as a thickness of the layer increases. The measured property is allowed to vary cyclically for one or more cycles. If there is a difference between a time period of one or more of the cycles and an expected time period associated with the setpoint temperature, the temperature control system is adjusted based on the difference.

28 Claims, 7 Drawing Sheets

CALIBRATION OF TEMPERATURE CONTROL SYSTEM FOR SEMICONDUCTOR PROCESSING CHAMBER

CLAIM FOR PRIORITY

This application claims priority to Provisional Patent Application No. 61/012,397, filed on Dec. 7, 2007, the entire disclosure of which is incorporated herein by reference.

BACKGROUND OF THE INVENTION

1. Field of the Invention

The present invention relates generally to semiconductor processing equipment and specifically to systems and methods for calibrating a temperature control system for a substrate processing chamber.

2. Description of the Related Art

High temperature processing chambers are used for depositing various material layers onto semiconductor substrates, such as silicon wafers. A substrate is placed on a substrate holder, such as a susceptor, within the processing chamber. Both the substrate and the substrate holder are heated to a desired temperature. In an exemplary substrate treatment step, two or more reactant gases are conveyed over the heated substrate, where they chemically react with one another to cause chemical vapor deposition (CVD) of the reactant materials onto the substrate. Throughout subsequent processes, such as depositions, doping, lithography, etching, etc., these layers are made into integrated circuits, producing millions to billions of integrated devices, depending on the substrate size and the circuits' complexities.

As these integrated devices continue to become smaller, precise control of the processes becomes increasingly important. Various process parameters are carefully controlled to promote a high quality of the deposited layers, and in particular well-controlled and uniform film growth. Growth rate, and thus thickness uniformity of the deposited film, is a function of the mass transport of the reactant species conveyed to the substrate and the reaction rate at the surface of the substrate. At high temperatures, sometimes referred to as the "mass-transport limited regime," the film growth rate is primarily a function of the reactants' partial pressures, and small temperature changes have minimal effects on the growth rate. At low temperatures, sometimes referred to as the "kinetic regime," the film growth rate, while dependent on many variables, is dominated by temperature. Thus, substrate temperature is usually a critical process parameter in the kinetic regime, and a small change in temperature can result in a significant change in deposition rate and an undesirable or non-uniform layer thickness. Accordingly, it is usually important to accurately control the substrate temperature during deposition.

In a cold wall, single substrate reactor, temperature control systems are used to modify the heat output of heating elements, such as radiant heat lamps, in response to temperature readings from temperature sensors that measure temperature within the processing chamber. The temperature sensors typically comprise thermocouples mounted around and below the substrate, or optical pyrometers that allow temperature to be determined by measuring the substrate's thermal radiation.

Optical pyrometers, carefully positioned in the processing chamber, can facilitate the determination of substrate temperature by measuring the light radiation emitted by the substrate. Pyrometers are sometimes preferred over thermocouples because they react faster to temperature changes. However, if direct or reflected light from elements other than the substrate, such as from heating lamps, reaches the pyrometer, then the light radiation emitted from the substrate is only a part of the total radiation that the pyrometer receives, causing inaccuracies in the temperature readings. In some commercial systems, a pyrometer temperature measurement from the substrate is used directly as feedback to the heating/temperature control system. In order to ensure that only radiation from the substrate reaches the pyrometer, these systems must make significant design compromises, such as shielding the pyrometer or adjusting the placement of various components. Furthermore, the relationship between the substrate temperature and emissivity changes in different temperature ranges. Thus, it is easiest to use pyrometers within specific, discrete temperature ranges, and other factors must be considered when reading temperatures over a very broad range. For these reasons, thermocouples are often more preferable than pyrometers as a means for measuring the temperature of the substrate.

One problem in substrate reactors that use thermocouples is thermocouple drift, which is the tendency of thermocouple outputs to shift (i.e., report temperature less accurately, typically with a bias up or down) over time, for example over the course of many runs spanning days, months, or years. Thermocouple drift can be caused by a variety of reasons, including degradation of the material from which the thermocouple is formed (e.g., platinum degradation or grain slippage), deterioration of the thermocouple junction or shape, devitrification of the quartz envelope of the thermocouple, and movement of the thermocouple. Thus, temperature control systems are often calibrated from time to time to improve temperature control of the substrate.

In addition to thermocouple drift, there are a variety of other factors that can lead to inaccuracies in substrate temperature control. First, if heat lamps are used to heat the wafer, each lamp's power output can vary over time. Second, some reactors include reflective surfaces (e.g., gold surfaces) that surround the reaction chamber and reflect radiation toward the substrate and susceptor, and these reflective surfaces can degrade over time. Third, the emissivity of the susceptor itself can change over time. Fourth, material deposits (e.g., silicon) on the susceptor (e.g., a graphite susceptor with a silicon carbide coating) can cause temperature shifts as well.

One way in which a reactor's temperature control system is calibrated involves the use of thickness monitor wafers or boron-implanted wafers that can be used and then subsequently examined to determine the thickness of a film deposited on the wafer surface. Typical usage of a thickness monitor wafer involves depositing a film thereon and measuring the deposited film thickness with an ellipsometer or other metrology. The measured film thickness provides an estimate of the wafer temperature during the deposition. Typical usage of a boron-implanted wafer involves positioning it in a hot chamber and then measuring the extent of the boron diffusion into the wafer surface. Since diffusion is a function of time and temperature, the measured diffusion over a given time provides an estimate of the wafer temperature during the diffusion. These methods are undesirable in terms of reactor downtime and wafer cost, partly because they involve removing the wafer from the chamber for measuring film thickness or extent of diffusion.

Another way in which a reactor's temperature control system is calibrated involves visually interpreting color variations of a deposited layer, and adjusting the thermocouples accordingly. As noted above, variations in temperature result in variations in reaction rate across a substrate surface, particularly in the kinetic regime. These reaction rate variations produce differences in deposited layer thickness. It is known that, for selected thicknesses, a chemically deposited layer exhibits color variations corresponding to the thickness variations that result from surface temperature variations. Moreover, the relationship between color and temperature is understood sufficiently to know roughly how much to adjust heat output of the heating devices for a given color variation. After a film is deposited, a technician visually interprets the color variations and makes appropriate adjustments to the temperature control system to compensate for temperature non-uniformities that would have caused the color variations. Further details of this method are disclosed in U.S. Pat. No. 6,126,744. While this method of calibrating a temperature control system is very useful, it is somewhat limited and arbitrary because it depends upon a human technician's visual interpretation of color.

SUMMARY OF THE INVENTION

Accordingly, it is a principle object and advantage of the present invention to overcome some or all of these limitations and to provide an improved apparatus and method for calibrating temperature sensors.

In one aspect, the present application provides a method of calibrating a temperature control system. In accordance with the method, a heating apparatus, a temperature sensor, and a temperature control system are provided. The heating apparatus is configured to heat a semiconductor processing chamber. The temperature sensor is configured to generate a signal indicative of a temperature within the processing chamber. The temperature control system is configured to control the heating apparatus based on the signal from the temperature sensor. A thickness of a layer of material in the processing chamber is varied. While varying the layer thickness, a variation of a property of the layer is measured, the property having a cyclical variation as a thickness of the layer varies. A cycle time period of the cyclical variation of the property is measured, and the temperature control system is adjusted based on the measured cycle time period.

In another aspect, the present application provides a method of calibrating a temperature control system. In accordance with the method, a heating apparatus, a temperature sensor, and a temperature control system are provided. The heating apparatus is configured to heat a semiconductor processing chamber. The temperature sensor is configured to generate a signal indicative of a temperature within the processing chamber. The temperature control system is configured to control the heating apparatus based on the signal from the temperature sensor. A thickness of a layer of material in the processing chamber is varied. While varying the layer thickness, a variation of a property of the layer is measured, the property having a cyclical variation as the layer thickness varies. After the measured variation of the property reaches at least one peak and at least one trough, a process duration is determined, the process duration beginning at a first point in the measured variation and ending at a second point in the measured variation. A difference between the process duration and an expected duration is determined, and the temperature control system is adjusted based on the difference.

In another aspect, the present application provides an apparatus for semiconductor processing. The apparatus comprises a semiconductor processing chamber, a heating apparatus configured to heat the processing chamber, a temperature sensor, a temperature control system, a cyclical property sensor, and a calibration system. The temperature sensor is configured to generate a signal indicative of a temperature within the processing chamber. The temperature control system is configured to control the heating apparatus based on the signal from the temperature sensor. The cyclical property sensor measures a property of a layer of a material in the chamber, the property having a cyclical variation as a thickness of the layer varies. The calibration system is configured to determine a cycle time period of a cyclical variation of the property of a layer of material in the chamber as measured by the cyclical property sensor while a thickness of the layer is varied. The calibration system is also configured to adjust the temperature control system based on the determined cycle time period.

In yet another aspect, the present application provides an apparatus for semiconductor processing, comprising a semiconductor processing chamber, a heating apparatus configured to heat the processing chamber, a temperature sensor, a temperature control system, a cyclical property sensor, and a calibration system. The temperature sensor is configured to generate a signal indicative of a temperature within the processing chamber. The temperature control system is configured to control the heating apparatus based on the signal from the temperature sensor. The cyclical property sensor measures a property of a layer of a material in the chamber, the property having a cyclical variation as a thickness of the layer varies. The calibration system is configured to determine, after the cyclical property sensor measures a variation of the property of a layer in the chamber and the measured variation reaches at least one peak and at least one trough, a process duration beginning at a first point in the measured variation and ending at a second point in the measured variation. The calibration system is also configured to determine a difference between the process duration and an expected duration, and to adjust the temperature control system based on the determined difference.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENTS

The present inventors have recognized that, within certain film thickness ranges, certain properties of a deposited film vary cyclically with the film thickness. Such properties are referred to herein as "cyclical properties." Two such cyclical properties are the film's color and emissivity. For example, the color of a silicon film deposited onto a 1000 Angstrom silicon dioxide layer coating a silicon wafer has been observed to vary as follows:

Blue (this is the base color of the 1000 Angstrom oxide)
Silver (200-300 Angstroms; only seen once as the polysilicon thickens)
Gold (400 Angstroms)
Blue
Green
Gold
Then the above colors repeat (except blue and silver every 500 Angstroms until the layer reaches a certain thickness, such as approximately 4000 Angstroms)

Figure 1:
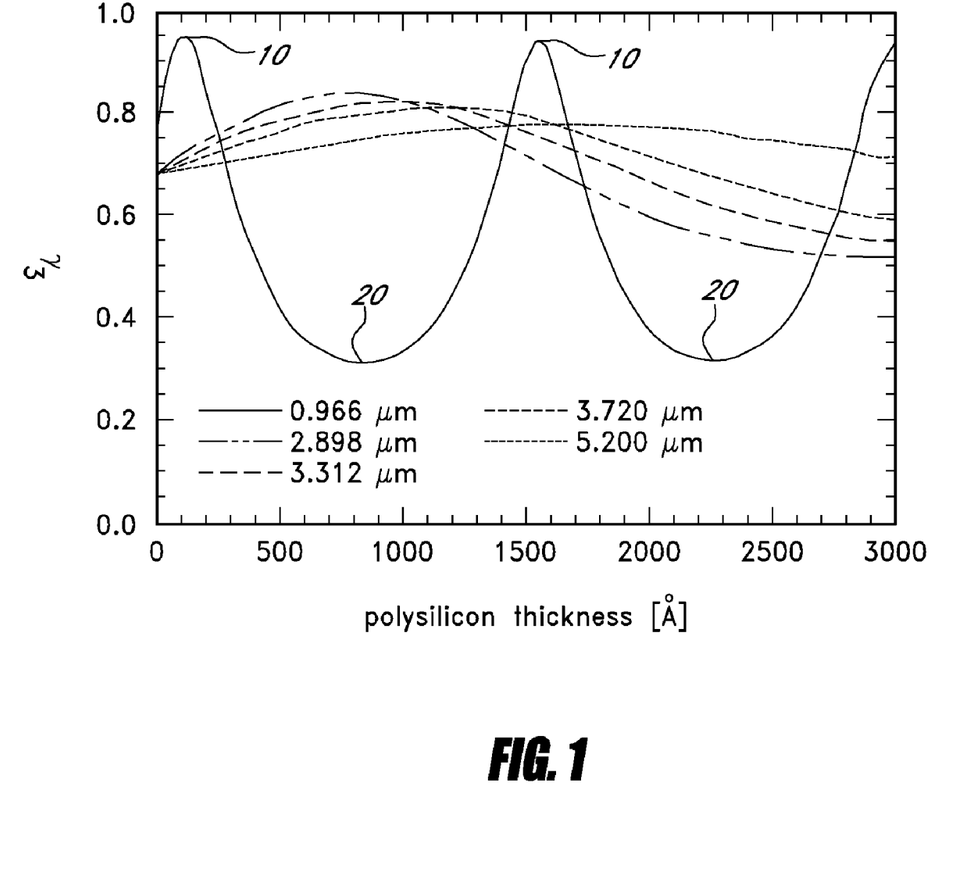
FIG. 1 is a graph showing the emissivity variation as a function of layer thickness at selected wavelengths of light for polysilicon deposited onto a 1000 Angstrom layer of silicon dioxide that coats a silicon wafer.

Similarly, the emissivity of a deposited layer varies cyclically with layer thickness as well. FIG. 1 is a graph showing the emissivity variation as a function of layer thickness at selected wavelengths of light for polysilicon deposited onto a 1000 Angstrom layer of silicon dioxide that coats a silicon wafer. Consider the emissivity of the polysilicon layer at a light wavelength of 0.966 microns. At that light wavelength, the emissivity varies between about 0.3 and about 0.95, depending on the polysilicon layer thickness. The polysilicon layer thickness difference between an adjacent pair of peaks 10 and/or pair of troughs 20 of the emissivity curve is about 1450 Angstroms. In other words, the emissivity undergoes a complete cycle of its variation during a growth of 1450 Angstroms of the polysilicon layer. The emissivity at other wavelengths of light also varies cyclically, although FIG. 1 only shows portions of one cyclical variation at wavelengths of 2.898 microns, 3.312 microns, 3.720 microns, and 5.200 microns. As seen in FIG. 1, the cyclical variation of a property as a function of film thickness does not necessarily imply a sinusoidal variation. Rather, in this context the term "cycle" refers more broadly to a recurring variation. Moreover, the wavelength of the recurring variation may change from peak to peak in certain cases. However, when growing different polysilicon layers directly on an underlying layer of a different material (e.g., an oxide layer), the wavelengths of the emissivity curves (as a function of layer thickness) for the different runs have been found to change in substantially the same way. For example, the wavelength of the $n^{th}$ cycle of a first run has been found to be the same as the wavelength of the $n^{th}$ cycle of a second run, as long as deposition conditions (pressure, temperature, reactant flow rates, etc.) are the same between the different runs. Thus, a cyclical variation, as used herein, does not imply a constant period or wavelength for successive cycles.

Figure 2:
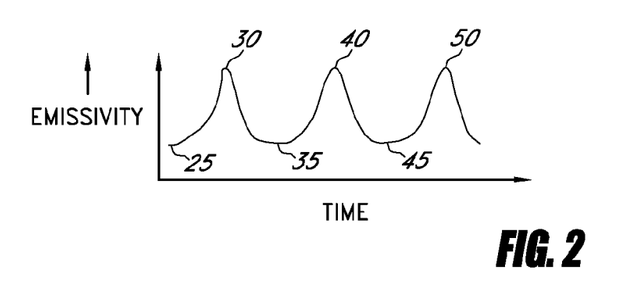
FIG. 2 is a graph showing the emissivity of a layer of material deposited by a CVD process at constant deposition conditions, as a function of time.

FIG. 2 is a graph showing the emissivity of a layer of material deposited by a CVD process at constant deposition conditions, as a function of time. The measured emissivity includes troughs 25, 35, and 45, and peaks 30, 40, and 50. As used herein, a "cycle time period" can be a temporal duration between a first peak or trough and a second peak or trough. A cycle time period can be the duration between two successive peaks, two successive troughs, two non-successive peaks (i.e., two peaks separated by intervening peaks), two non-successive troughs, or a peak and trough separated by at least one intervening peak and at least one intervening trough.

Assuming all other deposition conditions remain constant, a change in the temperature of a CVD chamber results in a change in the time period of the cycle of the cyclical property. For example, with reference again to FIG. 2, suppose a first layer of material is deposited onto an oxide layer of a first substrate at a first temperature. This will result in a particular cycle time period for a particular $n^{th}$ cycle of the cyclical property, which can be measured as the time gap between two peaks or two troughs in the cyclical property variation. If a second layer of the material is then deposited onto an oxide layer of a second substrate at a second temperature that is different than the first temperature, then the cycle time period of the $n^{th}$ cycle of the property will change. In other words, the time gap between the same two peaks or troughs will change. This stems from the fact that growth rate is primarily a function of temperature in the so-called kinetic regime. Therefore, as temperature increases, cycle time decreases.

For example, in FIG. 2 assume that trough 25 represents the emissivity of a silicon layer immediately upon depositing the silicon layer onto an underlying different material, such as an oxide layer. The first cycle is the variation from trough 25 to trough 35, and the second cycle is the variation from trough 35 to trough 45. The duration of the second cycle is the time period between troughs 35 and 45. Using the example described above, if the time period between troughs 35 and 45 for a silicon layer deposited onto an oxide layer of the first substrate is different than the time period between troughs 35 and 45 for a silicon layer deposited onto an oxide layer of the second substrate, then it can be deduced that the temperatures of the two depositions were different, assuming that all other deposition conditions were held constant.

Therefore, measuring a cycle time period of a cyclical property makes it possible to determine differences between the actual temperature obtained in a vapor deposition chamber and a setpoint temperature targetted by a temperature control system. In particular, a deposited layer's cycle time period can be used to determine the actual temperature in the chamber, for example based on empirically derived models. In other words, if (1) an empirical model indicates that a targeted setpoint temperature should produce an expected cycle time period for a particular $n^{th}$ cycle (or alternatively for a particular $m^{th}$ through $n^{th}$ cycles), (2) if a measured cycle time period for the $n^{th}$ cycle (or alternatively for the $m^{th}$ through $n^{th}$ cycles) is different than the expected cycle time period, and (3) other deposition conditions between the empirically derived expected time period and the measured time period are unchanged (such as pressure, reactant gas flow rates, etc.), then it can be concluded that the actual temperature is different than the targeted setpoint temperature. One possible cause is that at least one temperature sensor in the chamber is inaccurately reporting the temperature. As described above, other possible causes include degradation of lamp performance and power output over time, degradation of reflective surfaces (e.g., gold surfaces) that surround the reaction chamber, variation of the emissivity of the susceptor itself over time, and material deposits (e.g., silicon) on the susceptor. As described herein, the temperature control system can be adjusted or tuned, preferably automatically by a computer-implemented calibration system, based on the difference between the measured time period and the expected time period.

Embodiments of the present application include methods and apparatuses for calibrating a temperature control system based on comparisons between empirically derived cycle time periods and measured cycle time periods of cyclical properties of films deposited under constant deposition conditions. Use of these methods and apparatuses makes it possible to calibrate a reactor's temperature control system very quickly and accurately, and without the use of thickness monitor wafers or boron-implanted wafers as discussed above.

While this application describes various embodiments in the context of measuring a cyclical variation of a property during vapor deposition that causes a layer thickness to increase, it is theoretically possible to achieve the advantages of the invention while causing a layer thickness to decrease, preferably at a constant rate. Accordingly, it may be possible to measure a cyclical variation of a property while etching a layer of material. In either case (thickness increase or thickness decrease), it can be possible to determine a cycle time period associated with the cyclical variation of the property.

Figure 3:
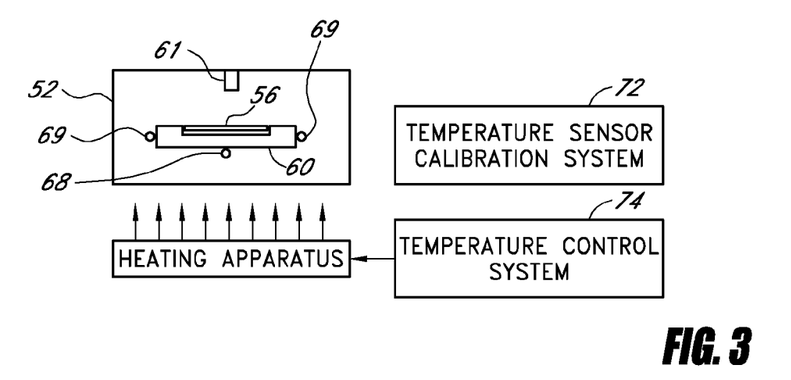
FIG. 3 is a schematic illustration of a single-substrate semiconductor processing apparatus in accordance with an embodiment of the present application.

FIG. 3 is a schematic illustration of a single-substrate semiconductor processing apparatus in accordance with an embodiment of the present application. The apparatus comprises a semiconductor processing chamber 52, preferably a CVD reaction chamber. The chamber 52 contains a substrate holder in the form of a susceptor 60, which supports a substrate 56 onto which layers of material can be deposited by, e.g., CVD. A thermocouple 68 acts as a central temperature sensor for measuring the temperature at the center of the susceptor 60, and one or more thermocouples 69 act as edge temperature sensors for measuring the temperature at the edge of the susceptor 60. It will be appreciated that such temperature sensors can be configured to measure temperature at alternative and/or additional locations in the chamber 52, including locations not depicted in FIG. 3. These temperature sensors can generate signals indicative of the sensed temperatures, as known in the art.

A heating apparatus 59 can be configured to heat the reaction chamber 52. A temperature control system 74 can be configured to receive the aforementioned signals from the thermocouples 68 and 69. Further, the temperature control system 74 can be configured to adjust or control a temperature of the reaction chamber 52 by controlling the heating apparatus 59. In a well known feedback control loop, the temperature control system 74 can control the heating apparatus 59 based on the signals from the thermocouples 68 and 69. The temperature control system 74 can be configured (e.g., programmed) to target a desired setpoint temperature in the chamber 52, such as a processing temperature for a particular reaction. In certain embodiments, the temperature control system is computer-implemented, including hardware and/or software components.

One or more cyclical property sensors 61 can also be provided. Each sensor 61 can be configured to measure a property of a layer of material, the property of a type that varies cyclically as a thickness of the layer varies. As noted above, such layer thickness variation can involve an increasing thickness (e.g., during vapor deposition under constant deposition conditions) or a decreasing thickness (e.g., during an etching process). In the illustrated embodiment, the sensor 61 is positioned and oriented to measure a property of a film deposited onto the substrate 56 or directly onto the susceptor 60 when a substrate is not present. The sensor 61 can create an output signal that is received by a calibration system 72. The calibration system 72 may be configured to calibrate or retune the temperature control system 74 after a deposition of a layer of the material onto a surface (e.g., a surface of the substrate 56, or a surface of the susceptor 60) inside the reaction chamber 52 under constant deposition conditions, as explained in further detail below. In certain embodiments, the calibration system 72 is configured to perform the temperature control system calibration steps of the calibration methods 100, 200 shown in FIGS. 5 and 7 discussed below. In certain embodiments, the calibration system 72 is computer-implemented, including hardware and/or software components.

Figure 4:
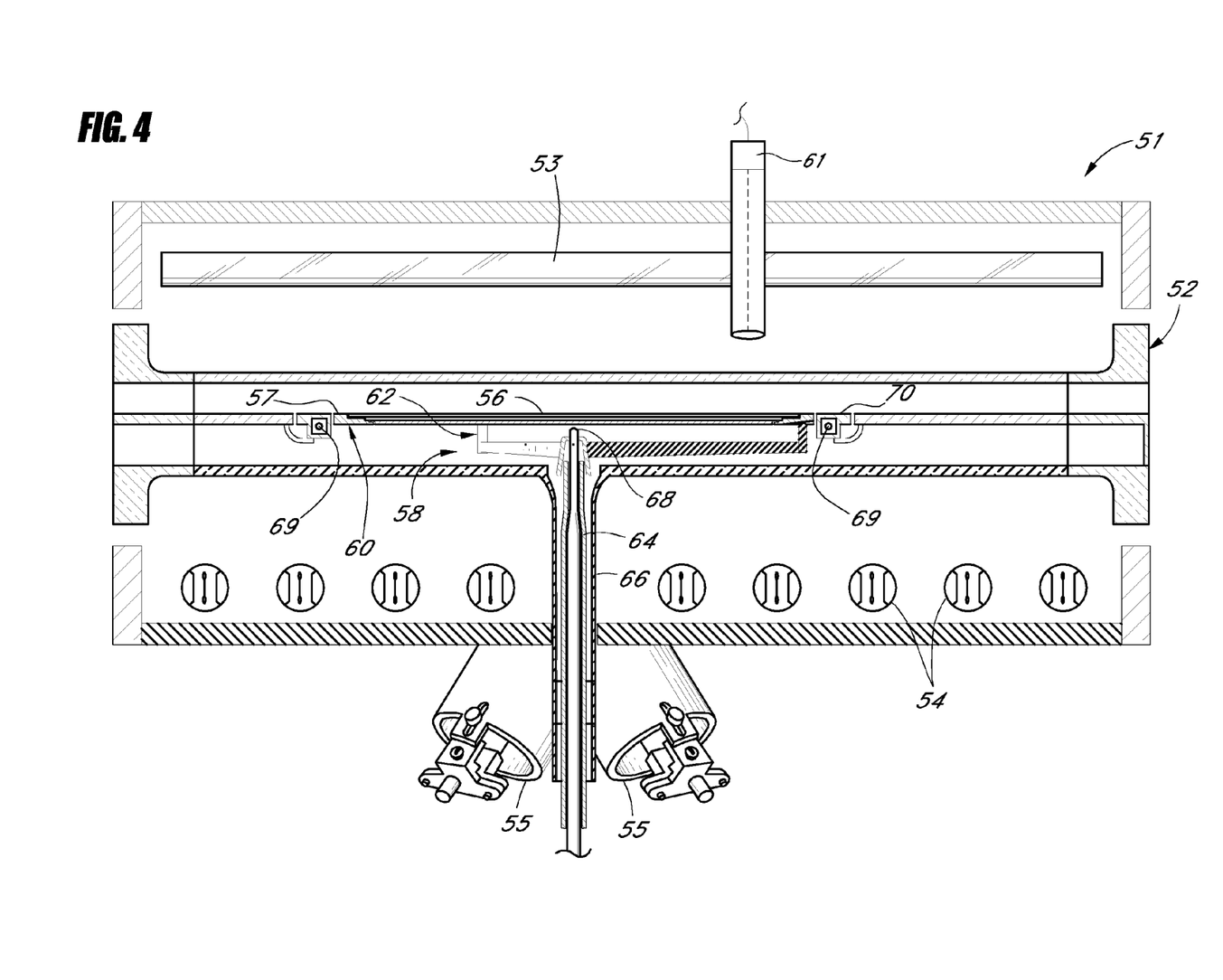
FIG. 4 is a vertical sectional view of a semiconductor processing chamber in accordance with one embodiment of the present application.

FIG. 4 is a vertical sectional view of a single-substrate semiconductor reactor 51, in accordance with one embodiment of the present application. While the presently disclosed embodiments are illustrated in the context of a single-substrate reactor, embodiments may alternatively involve batch reactors for processing a plurality of substrates simultaneously. Also, while the illustrated embodiment involves a cold wall reactor, skilled artisans will appreciate that other embodiments can involve so-called hot wall reactors.

Referring still to FIG. 4, the illustrated reactor 51 includes a semiconductor processing chamber 52, such as a CVD reaction chamber. As in FIG. 3, the chamber 52 contains a susceptor 60, on which rests a substrate 56. A support 58 includes a spider 62 that supports the susceptor 60. The spider 62 is mounted to a shaft 64, which extends downwardly through a tube 66 depending from a floor of the chamber 52. In certain embodiments, the shaft 64, spider 62, and susceptor 60 are configured to rotate about a central vertical axis in order to produce likewise rotation of the substrate 56 during vapor deposition.

As noted above, a heating apparatus is preferably configured to heat the reaction chamber 52. In the embodiment of FIG. 4, the heating apparatus includes an upper bank of linear tube-type radiant heat lamps 53, a lower bank of linear tube-type radiant heat lamps 54, and a plurality of spot lamps 55. The lamps 54 and 55 are preferably oriented perpendicularly to each other. As known in the art of semiconductor processing, the power of the various lamps 53, 54, and 55 can be controlled independently or in grouped zones in response to temperature sensors. It will be appreciated that less than all of the illustrated heat lamps can be provided. In other embodiments, the heating apparatus may include resistance-type heaters instead of or in addition to the radiant heat lamps. In certain embodiments, processing temperatures are normally between about 350° C. and 1200° C.

With continued reference to FIG. 4, the reaction chamber 52 includes one or more temperature sensors, such as thermocouples, configured to sense temperature within the reaction chamber. Like the chamber illustrated in FIG. 3, the chamber 52 of FIG. 4 includes a central thermocouple 68 and several edge thermocouples 69. The central thermocouple 68 is located underneath the susceptor 60 at the center thereof. The central thermocouple 68 allows for a determination of the temperature at the center of the substrate 56. The illustrated edge thermocouples 69 are located within a temperature compensation ring 70. The ring 70 surrounds the outer edge 57 of the susceptor 60 in order to compensate for increased heat loss from the susceptor edge 57. The edge thermocouples 69 allow for a determination of the temperature at the outer edge of the substrate 56. It will be appreciated that additional temperature sensors (including additional thermocouples) can be provided in the reaction chamber 52. As noted above, each of the temperature sensors, including thermocouples 68 and 69, can be configured to generate a signal indicative of the sensed temperature.

In the illustrated embodiment, the reaction chamber 52 includes one or more cyclical property sensors 61 configured to measure a cyclical property of a layer of material, or a property that varies cyclically as a thickness of the layer varies. While FIG. 4 only shows one such sensor 61, it will be appreciated that multiple sensors 61 can be provided. In a preferred embodiment, each sensor 61 is configured to measure the cyclical property at a location that is the same as or close to (e.g., within 10 mm, 5 mm, or 2 mm) the location at which a particular temperature sensor measures temperature. Thus, it may be desirable to provide the temperature sensors and cyclical property sensors 61 in pairs, although it is not required.

The cyclical property sensor 61 is preferably configured to measure the cyclical property during a process that causes a thickness of a layer of material to vary, such as a vapor deposition process or an etching process. One type of cyclical property sensor 61 is a color sensor that measures the color of a deposited film. Certain color sensors are much more sensitive than the human eye and typically output voltages that represent the relative amounts of RGB (red, green, blue) components of the detected color.

Another type of cyclical property sensor 61 is an emissivity sensor, such as an optical pyrometer. A pyrometer measures the thermal radiation of a target, which is a function of emissivity and temperature as follows:

$$j^* = \varepsilon \sigma T^4,$$

where $j^*$ is thermal radiation, $\varepsilon$ is emissivity, $\sigma$ is the Stefan-Boltzmann constant, and T is absolute temperature (in Kelvin). Thus, a pyrometer's output is equal to emissivity multiplied by a function of temperature. As discussed above, emissivity is a cyclical property over a particular thickness range during CVD growth or etching. Thus, during a deposition process under constant deposition conditions or an etching process under constant etching conditions, including constant temperature, the pyrometer output will also vary cyclically. The observed cycle time period (for one or more cycles) can be compared to an expected cycle time period that has previously been empirically derived when temperature was known with substantial certainty. The difference between the observed cycle time period and the expected cycle time period represents a difference between the setpoint temperature and the actual temperature in the chamber, and can be used to adjust the temperature control system 74 to compensate for such inaccuracy. It is believed that one advantage of using a pyrometer to measure cycle time periods, as opposed to using a color sensor to detect color cycle time periods, is that it has the potential to get a better signal-to-noise ratio, based on an assumption that emissivity varies much more as a function of film thickness. Also, a typical color sensor uses the reflection of a transmitted signal to detect color, and the transmitted signal can disadvantageously be drowned out by radiant lamp emissions.

While this application specifically discloses color sensors and pyrometers as examples of cyclical property sensors 61, it should be appreciated that other types of sensors 61 may be used. For example, another possible type of cyclical property sensor 61 measures absorption and reflectivity of laser light frequency.

Note that, in some cases, a cycle time period of a layer being deposited can be determined even if a measured cyclical property has not completed a full cyclical variation. For example, the cycle time period can be calculated by measuring the time gap between an adjacent peak and trough, as long as it is known how much (e.g., one half) of the cycle time period is represented by that time gap.

Figure 5:
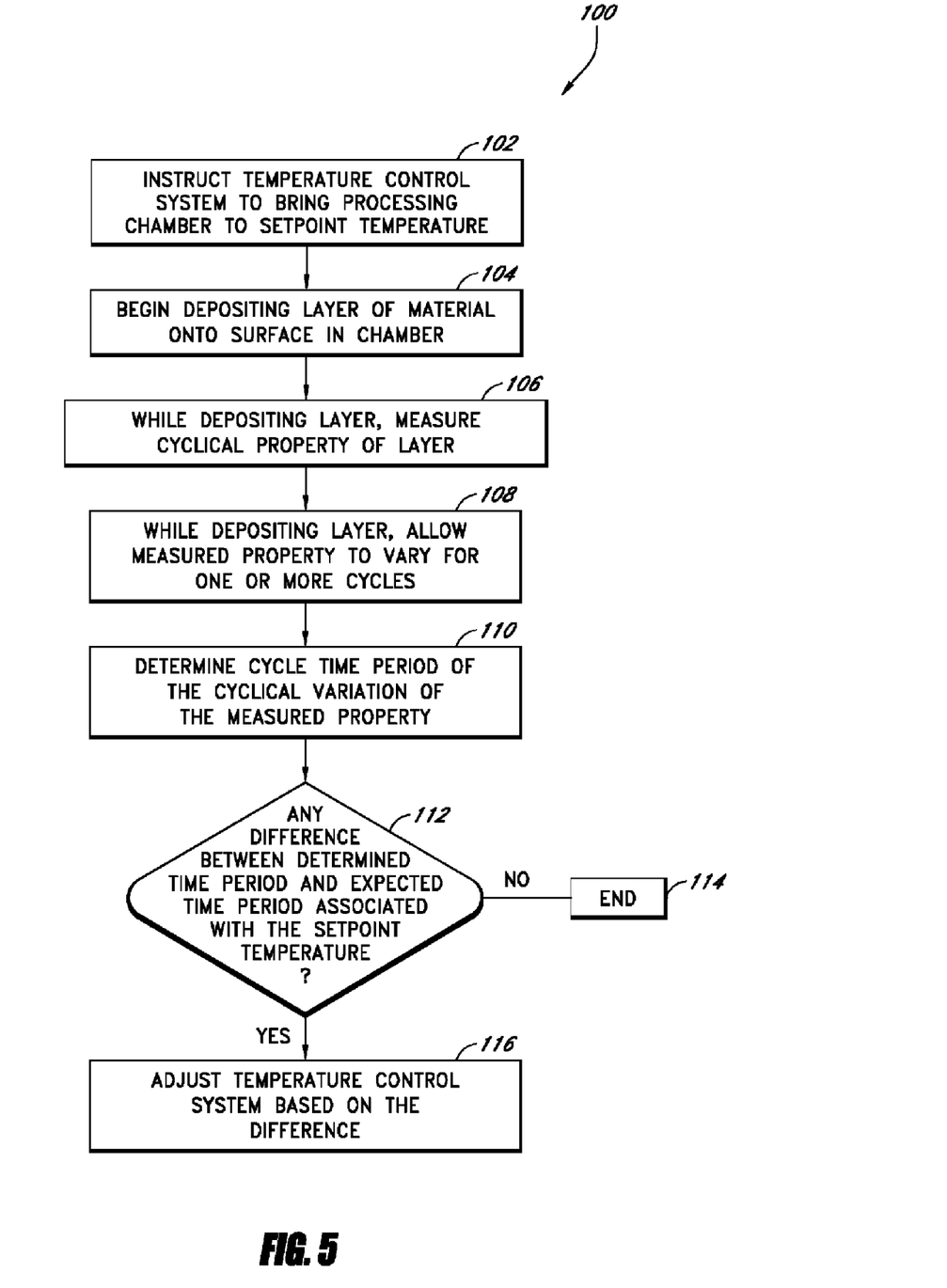
FIG. 5 is a flowchart illustrating a temperature control system calibration method in accordance with one embodiment of the present application.

Methods of calibrating a temperature control system 74 (FIG. 3) are now described. FIG. 5 is a flowchart illustrating a calibration method 100 in accordance with one embodiment, which involves a vapor deposition to vary the cyclical property. It will be understood that it is possible to employ an alternative method in which a layer of material is etched to vary the cyclical property. With reference to FIGS. 3-5, the method 100 can involve a heating apparatus 59, one or more temperature sensors (such as thermocouples 68 and 69), and a temperature control system 74. FIG. 5 is not intended to imply that all of the illustrated steps are required.

In a step 102, the temperature control system 74 is instructed to bring the processing chamber 52 to a targeted setpoint temperature. Such instruction can come, for example, from a technician or a computer system. At this point it is not known whether the chamber 52 will reach the targeted setpoint temperature, for example because the relied upon temperature sensors for the feedback control may inaccurately report the temperature. The calibration method 100 is conducted to detect and adjust for such temperature sensor inaccuracies, as well as inaccuracies stemming from other reasons as described above. In a step 104, a vapor deposition process is initiated to begin depositing a layer of material onto a surface in the chamber 52. This can be achieved by a CVD process, and is preferably conducted at substantially constant deposition conditions. The layer of material can be deposited onto a semiconductor substrate or wafer 56, a surface of a substrate holder or susceptor 60, or some other surface inside the chamber 52. Preferably, the layer of material is deposited onto an underlying material of a different material, such as an oxide layer.

In a step 106, while depositing the layer of material, a variation of a cyclical property of the layer is measured, such as by using at least one cyclical property sensor 61. As noted above, a cyclical property in this context is a property of the layer that is known to vary cyclically as a thickness of the layer increases under constant deposition conditions. In one embodiment, the cyclical property is a color of the deposited layer, and the sensor 61 is a color sensor. In another embodiment, the cyclical property is an emissivity of the deposited layer, and measuring the variation of the emissivity involves the use of an optical pyrometer as the sensor 61. In one embodiment, the sensor 61 is configured to measure the cyclical property at a position that is the same as or very close to the position at which one of the temperature sensors measures temperature.

In a step 108, while depositing the layer of material, the measured property is permitted to vary cyclically for one or more cycles of its variation. Step 108 can involve allowing the measured property to complete only one cycle, which reduces the time of the calibration method 100. On the other hand, step 108 can involve allowing the measured property to complete a plurality of cycles, which increases the calibration time but also increases the accuracy of the method 100. Another method of increasing the accuracy of the calibration method is to reduce the rate of film growth.

In a step 110, a time period of the one or more cycles of the variation of the measured property is determined. For example, if the measured property is color, this step can involve determining a time gap between two detections of the same color. In another example, if the measured property variation is an emissivity variation, this step can involve determining a time gap between two peaks or two troughs in a pyrometer's output signal. As explained above, the particular cycle (first, second, third, etc., relative to an underlying different material, such as an oxide layer) or cycles for which the time period is measured are preferably the same as the cycle or cycles of previously conducted depositions upon which an empirical model is based for comparison (see the discussion below of a "baseline layer" and an "expected time period").

In a decision step 112, it is determined if there is a difference between the determined time period in step 110 and an expected time period associated with the setpoint temperature. As noted above, the expected time period can be empirically derived prior to conducting the calibration method 100. Methods for empirically deriving the expected time period are discussed below. If there is no difference between the determined time period and the expected time period, then the calibration method 100 can end at 114. On the other hand, if there is a difference between the determined time period and the expected time period, then the temperature control system 74 can be adjusted in step 116 based on the difference. Such adjustment can involve applying or adjusting an offset value for one or more PID controllers associated with the temperature control system 74. For example, the offset values can compensate for temperature sensor drift. In a preferred embodiment, there is a separate PID controller for each temperature sensor in the chamber 52.

Figure 9:
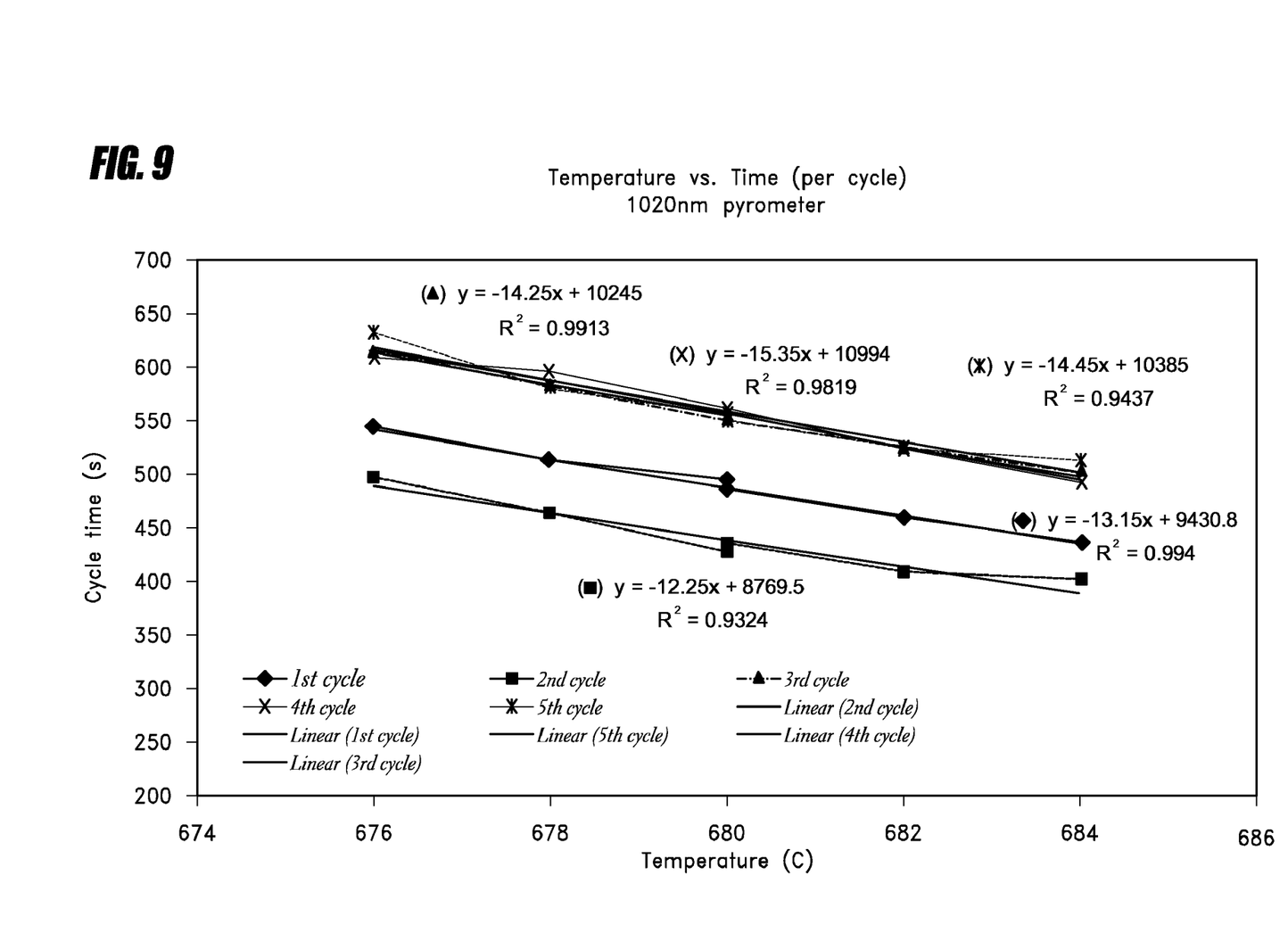
FIG. 9 is a plot of emissivity cycle time versus temperature for the deposition of silicon onto a silicon carbide surface of a susceptor, for five different cycles of emissivity variation.

In certain embodiments, the adjustment of the temperature control system 74 is conducted automatically by the calibration system 72 based on empirical response formulae. The relationship between temperature and cycle time can be empirically determined beforehand. For example, FIG. 9 is a plot of emissivity cycle time versus temperature for the deposition of silicon onto a silicon carbide surface of a susceptor. The plot shows the cycle times for five different cycles (i.e., the first, second, third, fourth, and fifth cycles). Note that even at a constant temperature, the cycle times vary in duration from the first through fifth cycles. Also note that for each particular cycle, an equation for best fit line extending through the plot points can be determined. For example, in FIG. 9, the observed cycle times for the first emissivity cycle at 676° C., 678° C., 680° C., 682° C., and 684° C. yield a best fit line equation of $y=-12.25x+8769.5$, where y is the cycle time in seconds and x is the temperature in Celsius. The equations for the second, third, fourth, and fifth emissivity cycles are also shown in FIG. 9. It should be understood that these curves are based only on one particular set of experiments, and that the actual relationships between temperature and cycle time can differ from those shown in FIG. 9. During a calibration run, the cycle time for any particular cycle (e.g., the first cycle) or number of cycles (e.g., the first through fifth cycles) can be observed. From a plot like that of FIG. 9, the observed cycle time can be used to find the actual temperature within the reaction chamber. Then, the difference between the actual temperature and the setpoint temperature can be calculated. In certain embodiments, that calculated temperature difference is a direct input to the calibration system 72 for purposes of calibrating the temperature control system 74.

Referring again to FIG. 5, step 108 of the calibration method 100 can be modified so that the measured property is not necessarily permitted to vary cyclically for a full cycle of its variation. As noted above, the variation of the measured property need not complete a cycle in order to determine an appropriate time period that can be compared to an empirically derived time period. For example, the cycle time period can be determined from the time gap between one peak and an adjacent trough occurring before or after the peak.

Figure 6:
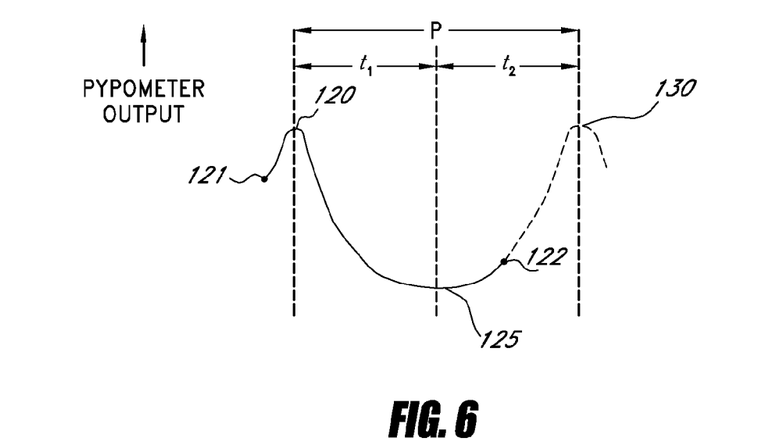
FIG. 6 is a graph showing a partial cycle of a pyrometer output signal as a function of time for a pyrometer measuring thermal radiance of a layer of material during the deposition of the layer under constant deposition conditions.

For instance, FIG. 6 shows, in solid line, a pyrometer output signal as a function of time, during the deposition of a layer of material under constant deposition conditions. The pyrometer signal begins at a point 121 and ends at a point 122, before the completion of an emissivity cycle. The measured signal traverses a peak 120 and a trough 125. The time period $t_1$ between the peak 120 and trough 125 can be measured and compared to the time period between a corresponding peak and a subsequent trough in an empirically derived pyrometer signal under the same deposition conditions, in which temperature was known with relative certainty. In another example, suppose the pyrometer signal begins at a point between peak 120 and trough 125 and continues beyond a next peak 130. In that case, it is possible to measure a time period $t_2$ between the trough 125 and the peak 130 and compare it to the time period between a corresponding trough and a subsequent peak in the empirically derived pyrometer signal mentioned above.

Moreover, it is not necessary to compare time periods that begin and end at peaks and/or troughs in the measured variation of the cyclical property, although that may be most convenient. For example, it may be possible to select first and second points in the measured variation, determine a process duration between the two points, and compare the determined process duration to a previously empirically derived expected duration associated with corresponding first and second points of a variation of the cyclical property under the same deposition conditions at the setpoint temperature. While the first and second points can be at peaks and/or troughs in the variation of the measured cyclical property, such points need not always be at peaks and/or troughs.

Figure 7:
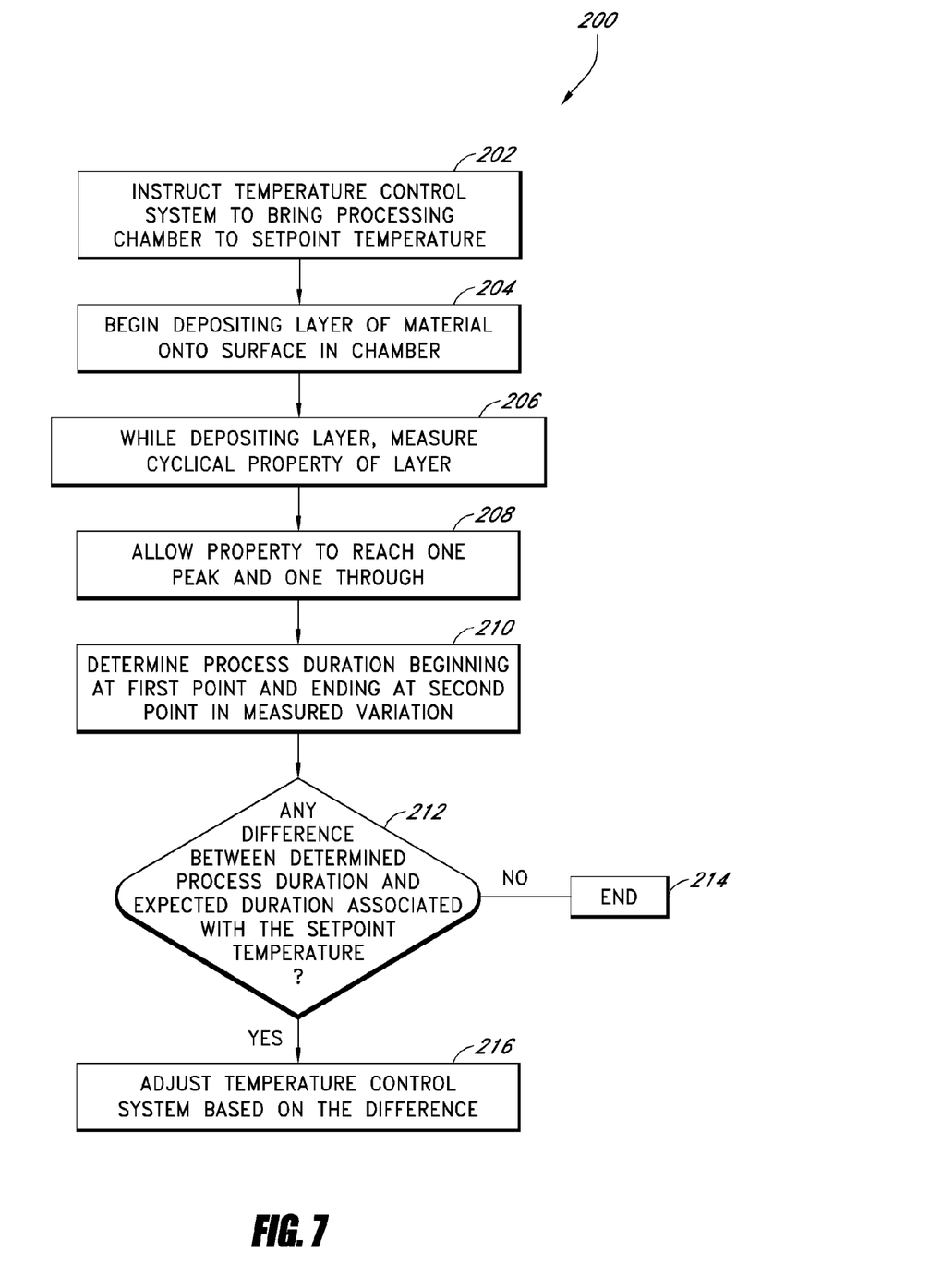
FIG. 7 is a flowchart illustrating a temperature control system calibration method in accordance with another embodiment of the present application.

Therefore, in certain embodiments, steps 108, 110, and 112 of FIG. 5 are modified as shown in the calibration method 200 of FIG. 7. In the method 200, steps 202, 204, 206, 214, and 216 can be the same as steps 102, 104, 106, 114, and 116, respectively, of the method 100. The method 200 can differ from the method 100 only in steps 208, 210, and 212. FIG. 7 is not intended to imply that all of the illustrated steps are required.

In step 208, the measured variation of the property is permitted to reach at least one peak and at least one trough. Step 210 is the determination of a process duration beginning and ending at first and second points, respectively, in the measured variation of the property. In certain embodiments, the first and second points each comprise one of a peak and a trough in the measured variation of the property. Notwithstanding the above discussion of the ability to measure a suitable duration for comparison with empirical data without completing a cycle of the measured property, the determined process duration in step 210 may extend over a plurality of cyclical variations of the measured property. In decision step 212, the process duration is compared with an expected duration associated with the targeted setpoint temperature. If there is a difference between these two durations, then, in step 216, the temperature control system can be adjusted based on the difference. If there is no difference between the two durations, then the method 200 can end at 214.

Figure 8:
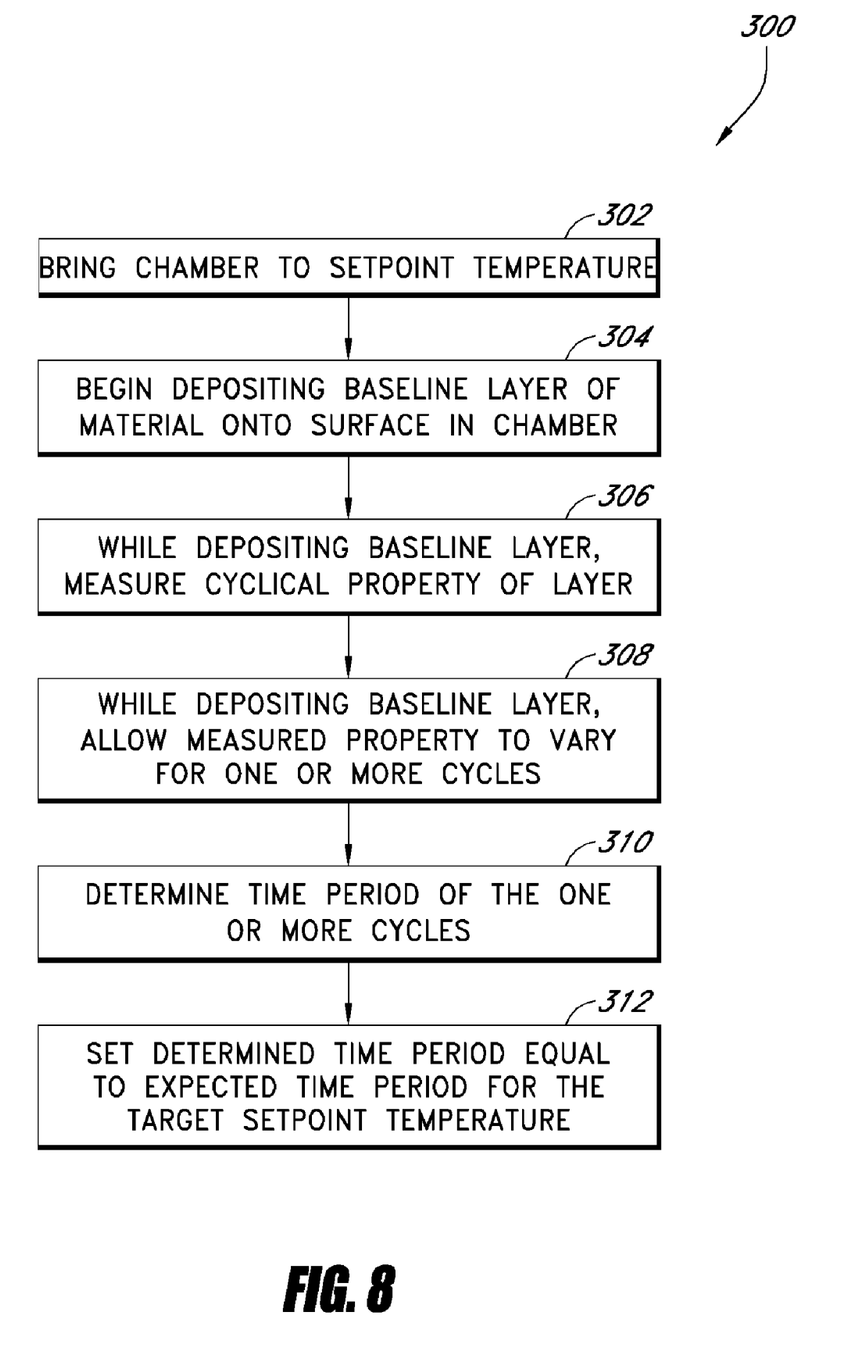
FIG. 8 is a flowchart illustrating a method of empirically determining the "expected time period" of the calibration method of FIG. 5, in accordance with one embodiment.

With reference to FIGS. 5 and 8, methods of empirically deriving an expected time period for a particular chamber setpoint temperature are now described. FIG. 8 is a flowchart illustrating a method 300 of empirically determining the "expected time period" of the calibration method 100 of FIG. 5, in accordance with one embodiment. The method 300 is conducted prior to the calibration method 100, preferably under substantially the same deposition conditions (including chamber pressure, reactants, reactant flow rates, and reactant partial pressures), and preferably on the same type of underlying surface material (e.g., an oxide layer).

In a step 302, the reaction chamber is brought to the setpoint temperature associated with the subsequent calibration method 100. In step 302, the chamber temperature is preferably known with substantial certainty. Other temperature sensors may be provided to ensure that the chamber, or an area of interest within the chamber, is actually at the setpoint temperature. In a step 304, a vapor deposition is initiated to deposit a "baseline layer" of the same material subsequently deposited in the calibration method 100. As used herein, "baseline layer" refers to the layer deposited during the empirical determination of the expected time period of a cyclical property against which a measured time period is subsequently compared, as explained above. As noted above, the deposition of the baseline layer is preferably conducted under the same deposition conditions subsequently used for the calibration method 100. The baseline layer can be deposited onto a substrate supported in the chamber, or onto another surface, such as a surface of a susceptor. As noted above, the baseline layer is preferably deposited on an underlying layer of a different material, such as an oxide layer, and the subsequent calibration runs preferably involve deposition onto the same underlying material. In certain embodiments, both the baseline layer and the layers subsequently deposited during calibration runs are deposited onto oxide surfaces.

Step 306 involves measuring a variation of the cyclical property of the baseline layer while depositing the baseline layer of material. It will be understood that this is the same cyclical property as in the subsequent calibration method 100. Step 308 involves allowing the measured property to vary cyclically for one or more cycles of its variation while depositing the baseline layer of material. Step 310 involves determining a time period of said one or more cycles of the variation of the measured property of the baseline layer. In step 312, the expected time period of the calibration method 100 is made equal to the determined time period of step 310.

With reference to FIGS. 7 and 8, the method 300 for determining the expected time period can be modified slightly to be consistent with the calibration method 200. In particular, steps 308, 310, and 312 can be replaced with the following steps. Instead of allowing the measured property of the baseline layer to vary for one or more cycles, as in step 308, the measured property is allowed to reach a first point and a second point. In certain embodiments, each of the first and second points of the measured property of the baseline layer comprises one of a peak and a trough. The total number of peaks and troughs that are between the first and second points of the measured property of the baseline layer is equal to a specific total number of peaks and troughs between the first and second points of the calibration method 200. A baseline process duration begins at the first point in the measured variation of the property of the baseline layer and ends at the second point in the measured variation of the property of the baseline layer. This baseline process duration is determined. Finally, the baseline process duration is set equal to the expected duration of the calibration method 200.

In certain embodiments, the calibration system 72 of FIG. 3 is configured to perform certain ones of the steps shown in FIGS. 5 and 7. The calibration system 72 can be configured to determine a cycle time period of a cyclical variation of a property of a layer of material in the chamber 52, as measured by the cyclical property sensor 61, while a thickness of the layer is varied. As noted above, the layer thickness can be varied in different ways, such as by a vapor deposition process or an etching process. The calibration system 72 can be configured to adjust the temperature control system 74 based on the determined cycle time period. The calibration system 72 can be configured to determine the cycle time period for a variation of the property that is measured while the temperature control system 74 targets a setpoint temperature inside the chamber 52. The calibration system 72 can be configured to compare the determined cycle time period with an expected cycle time period associated with the setpoint temperature, and respond to the difference by adjusting or applying an offset for a PID controller associated with the temperature control system 74. In certain embodiments, the temperature control system 74 can be configured to control the heating apparatus 59 based on two or more of the signals from the temperature sensors, and the calibration system 72 can be configured to adjust the temperature control system 74 by applying or adjusting offset values for PID controllers associated with two or more of the temperature sensors. In certain embodiments, the calibration system 72 comprises one or more hardware and/or software modules that substantially control the calibration process.

Embodiments of the present application provide an efficient in situ method to calibrate a temperature control system to compensate for, e.g., drift of temperature sensors, including the detection of very small temperature changes (e.g., less than 1° C.). The above-described temperature control system calibration methods are non-intrusive because they do not require the use of a thickness monitor wafer or a boron-implanted wafer, which require removal and analysis of the wafer after deposition. As a result of the presently disclosed embodiments, reactor downtime is decreased, which in turn improves substrate throughput. Also, these calibration methods do not involve any significant setup costs apart from the initial arrangement of cyclical property sensors (FIGS. 3 and 4) and the calibration system 72. Perhaps more importantly, these less intrusive methods of calibrating a temperature control system can be conducted much more frequently than previous calibration methods, which reduces the risk of the semiconductor processes falling outside of acceptable limits. As a result, device yield can be substantially improved.

In some embodiments, temperature control system calibration is conducted in real-time during processing of regular production substrates. That is, variations between measured cycle time periods and expected cycle time periods can be detected and compensated for during actual production runs. In other embodiments, a test substrate is used for calibrating the temperature control system.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A method of calibrating a temperature control system, comprising:
   providing a heating apparatus configured to heat a semiconductor processing chamber;
   providing a temperature sensor configured to generate a signal indicative of a temperature within the processing chamber;
   providing a temperature control system configured to control the heating apparatus based on the signal from the temperature sensor;
   varying a thickness of a layer of material in the processing chamber;

measuring, while varying the layer thickness, a variation of a property of the layer having a cyclical variation as a thickness of the layer varies;

measuring a cycle time period of the cyclical variation of the property; and adjusting the temperature control system based on the measured cycle time period.

2. The method of claim 1, wherein varying the layer thickness comprises depositing the layer of material onto a surface in the processing chamber by a vapor deposition process, the method further comprising:

instructing the temperature control system to bring the processing chamber to a setpoint temperature during the depositing step; and allowing the measured property to vary cyclically for one or more cycles of its variation while depositing the layer of material;

wherein determining the cycle time period comprises determining a time period of one or more of said one or more cycles of the variation of the measured property, and wherein adjusting the temperature control system comprises responding to a difference between the measured cycle time period and an expected time period associated with the setpoint temperature by applying or adjusting an offset value for a PID controller associated with the temperature sensor.

3. The method of claim 2, further comprising, prior to said depositing step, determining said expected time period by:

bringing the processing chamber to the setpoint temperature;

depositing a baseline layer of the material onto a surface inside the processing chamber by a vapor deposition process;

measuring, while depositing the baseline later of material, a variation of said property of the baseline layer;

allowing the measured property to vary cyclically for one or more cycles of its variation while depositing the baseline layer of material;

determining a time period of one or more of said one or more cycles of the variation of the measured property of the baseline layer; and setting the expected time period equal to the determined time period of said one or more cycles of the variation of the measured property of the baseline layer.

4. The method of claim 2, wherein allowing the measured property to vary cyclically for one or more cycles of its variation comprises allowing the measured property to vary cyclically for a plurality of cycles of its variation.

5. The method of claim 1, wherein the property comprises a color of the deposited layer.

6. The method of claim 1, wherein the property comprises an emissivity of the deposited layer.

7. The method of claim 6, wherein measuring the variation of the emissivity comprises using an optical pyrometer.

8. The method of claim 1, wherein adjusting the temperature control system comprises automatically adjusting the temperature control system.

9. The method of claim 1, wherein adjusting the temperature control system comprises applying or adjusting an offset value for a PID controller associated with the temperature sensor.

10. The method of claim 1, wherein varying the layer thickness comprises depositing the layer of material onto a semiconductor wafer.

11. The method of claim 1, wherein varying the layer thickness comprises depositing the layer of material onto a surface of a susceptor.

12. The method of claim 1, wherein:

providing a temperature sensor comprises providing a plurality of temperature sensors each configured to generate a signal indicative of a temperature within the processing chamber;

the temperature control system is configured to control the heating apparatus based on two or more of the signals from the temperature sensors; and adjusting the temperature control system comprises applying or adjusting offset values for PID controllers associated with two or more of the temperature sensors.

13. The method of claim 1, wherein determining said cycle time period comprises determining a time gap between two peaks or two troughs in said measured variation of the property.

14. A method of calibrating a temperature control system, comprising:

providing a heating apparatus configured to heat a semiconductor processing chamber;

providing a temperature sensor configured to generate a signal indicative of a temperature within the processing chamber;

providing a temperature control system configured to control the heating apparatus based on the signal from the temperature sensor;

varying a thickness of a layer of material in the processing chamber;

measuring, while varying the layer thickness, a variation of a property of the layer having a cyclical variation as the layer thickness varies;

after the measured variation of the property reaches at least one peak and at least one trough, determining a process duration beginning at a first point in the measured variation and ending at a second point in the measured variation;

determining a difference between the process duration and an expected duration; and adjusting the temperature control system based on the difference.

15. The method of claim 14, wherein varying the layer thickness comprises depositing the layer onto a surface in the processing chamber by a vapor deposition process, the method further comprising instructing the temperature control system to bring the processing chamber to a setpoint temperature during the depositing step, the expected duration being based on the setpoint temperature, wherein adjusting the temperature control system comprises responding to the difference between the process duration and the expected duration by applying or adjusting an offset value for a PID controller associated with the temperature sensor.

16. The method of claim 15, wherein the first and second points each comprise one of a peak and a trough in the measured variation of the property, the measured variation including a specific total number of peaks and troughs between said first and second points, the method further comprising, prior to said depositing step, determining said expected duration by:

bringing the processing chamber to the setpoint temperature;

depositing a baseline layer of the material onto a surface inside the processing chamber by a vapor deposition process;

measuring, while depositing the baseline layer of material, a variation of said property of the baseline layer;

allowing the measured property of the baseline layer to reach a first point and a second point, each of the first and second points of the measured property of the baseline layer comprising one of a peak and a trough, a total number of peaks and troughs between the first and second points of the measured property of the baseline layer being equal to said specific number;

determining a baseline process duration beginning at the first point in the measured variation of the property of the baseline layer and ending at the second point in the measured variation of the property of the baseline layer; and setting the baseline process duration equal to the expected duration.

17. The method of claim 14, wherein the first and second points each comprise one of a peak and a trough in the measured variation of the property.

18. An apparatus for semiconductor processing, comprising:
a semiconductor processing chamber;
a heating apparatus configured to heat the processing chamber;
a temperature sensor configured to generate a signal indicative of a temperature within the processing chamber;
a temperature control system configured to control the heating apparatus based on the signal from the temperature sensor;
a cyclical property sensor for measuring a property of a layer of a material in the chamber, the property having a cyclical variation as a thickness of the layer varies; and
a calibration system configured to determine a cycle time period of a cyclical variation of the property of a layer of material in the chamber as measured by the cyclical property sensor while a thickness of the layer is varied, the calibration system configured to adjust the temperature control system based on the determined cycle time period.

19. The apparatus of claim 18, wherein the calibration system is configured to determine the cycle time period of a cyclical variation of the property of a layer that is measured while the layer is deposited by a vapor deposition process.

20. The apparatus of claim 19, wherein the calibration system is configured to determine the cycle time period for a variation of the property that is measured while the temperature control system targets a setpoint temperature inside the chamber, the calibration system configured to compare the determined cycle time period with an expected cycle time period associated with the setpoint temperature, the calibration system configured to respond to a difference between the determined time period and the expected time period by automatically adjusting or applying an offset for a PID controller associated with the temperature sensor.

21. The apparatus of claim 18, wherein the property comprises a color of the deposited layer.

22. The apparatus of claim 18, wherein the property comprises an emissivity of the deposited layer.

23. The apparatus of claim 18, wherein the cyclical property sensor comprises an optical pyrometer.

24. The apparatus of claim 18, wherein the calibration system is configured to determine a cycle time period extending over a plurality of cyclical variations of the measured property.

25. The apparatus of claim 18, further comprising a plurality of temperature sensors each configured to generate a signal indicative of a temperature within the processing chamber, wherein the temperature control system is configured to control the heating apparatus based on two or more of the signals from the temperature sensors, the calibration system being configured to adjust the temperature control system by applying or adjusting offset values for PID controllers associated with two or more of the temperature sensors.

26. An apparatus for semiconductor processing, comprising:
a semiconductor processing chamber;
a heating apparatus configured to heat the processing chamber;
a temperature sensor configured to generate a signal indicative of a temperature within the processing chamber;
a temperature control system configured to control the heating apparatus based on the signal from the temperature sensor;
a cyclical property sensor for measuring a property of a layer of a material in the chamber, the property having a cyclical variation as a thickness of the layer varies; and
a calibration system configured to determine, after the cyclical property sensor measures a variation of the property of a layer in the chamber and the measured variation reaches at least one peak and at least one trough, a process duration beginning at a first point in the measured variation and ending at a second point in the measured variation, the calibration system configured to determine a difference between the process duration and an expected duration, the calibration system configured to adjust the temperature control system based on the determined difference.

27. The apparatus of claim 26, wherein the calibration system is configured to determine the process duration after the cyclical property sensor measures the variation of the property of the layer during a vapor deposition process of the layer, the calibration system configured to determine the process duration for a variation of the property that is measured while the temperature control system targets a setpoint temperature inside the chamber during the vapor deposition process, the expected duration being associated with the setpoint temperature, the calibration system configured to respond to a difference between the process duration and the expected duration by automatically adjusting or applying an offset for a PID controller associated with the temperature sensor.

28. The apparatus of claim 26, wherein the first and second points each comprise one of a peak and a trough in the measured variation of the property.

* * * * *

UNITED STATES PATENT AND TRADEMARK OFFICE
CERTIFICATE OF CORRECTION

| | | |
|---|---|---|
| PATENT NO. | : 8,047,706 B2 | Page 1 of 1 |
| APPLICATION NO. | : 12/273440 | |
| DATED | : November 1, 2011 | |
| INVENTOR(S) | : Goodman et al. | |

It is certified that error appears in the above-identified patent and that said Letters Patent is hereby corrected as shown below:

In the Drawings, Sheet 2 of 7, in FIG. 6, please replace "PYPOMETER" with -- PYROMETER --.

In Claim 3, column 15, line 34, please replace "later" with -- layer --.

Signed and Sealed this
Twenty-seventh Day of March, 2012

David J. Kappos
*Director of the United States Patent and Trademark Office*